United States Patent [19]

Hausler et al.

[11] Patent Number: 4,956,216
[45] Date of Patent: Sep. 11, 1990

[54] OPTICAL RECORDING MEDIUM

[75] Inventors: Alfons Hausler, Obertshausen; Rainer Ludwig, Karlstein-Dettingen; Michael Geibler, Wächterbach; Michael Jung, Kahl am Main, all of Fed. Rep. of Germany

[73] Assignee: Leybold Aktiengesellschaft, Hanau, Fed. Rep. of Germany

[21] Appl. No.: 261,766

[22] Filed: Oct. 24, 1988

[30] Foreign Application Priority Data

Jun. 3, 1988 [DE] Fed. Rep. of Germany ....... 3818934

[51] Int. Cl.$^5$ ............................................. B32B 3/00
[52] U.S. Cl. ........................................ 428/64; 428/65;
428/207; 428/412; 428/545; 428/913; 369/288;
346/1.1; 346/76 L; 346/135.1; 430/945;
427/58; 427/69; 427/162; 427/166
[58] Field of Search ................... 428/64, 65, 209, 412,
428/545, 913; 369/288; 346/1.1, 76 L, 135.1;
430/945; 427/58, 69, 162, 166

[56] References Cited

U.S. PATENT DOCUMENTS 4,340,959  7/1982  Levin .................................. 369/288
4,435,801  3/1984  Levin .................................. 369/288

Primary Examiner—Patrick Ryan
Attorney, Agent, or Firm—Felfe & Lynch

[57] ABSTRACT

In an optical recording medium, for an audio-video or ROM compact disc comprising a pitted translucent base material and a layer (9) of a corrosion resistant metal or combination of metals from the groups 4N, 5N, 7N or 8N of the periodic table of elements is disclosed. For example NiCr can Be Applied onto the surface having the pits (7), thereby providing good adhesion, reflecting light and providing printable surface and not requiring any further coating such as a protective lacquer. Also, in the event that a gold-colored glossy layer is necessary, a CuBe layer can be sputtered onto the substrate (8).

20 Claims, 1 Drawing Sheet

OPTICAL RECORDING MEDIUM

BACKGROUND OF THE INVENTION

1. Field of the Invention

The invention pertains to an optical recording medium. More particularly, it pertains to optical media especially an audio, video or ROM compact disc medium, comprising a substrate of a translucent base material, for example a synthetic substrate with cavities formed in the substrate, the so-called "pits", and a light reflecting layer adhering firmly to one surface of the substrate and covering the pits.

2. Discussion of Related Art

An optical recording substrate, providing a substrate of translucent glass which is coated on one side by a first light reflecting layer, for example a layer of gold, onto which a second layer of a light-absorbing dye, for example a phthalocyanine dye, is applied, is known (U.S. Pat. No. 4,241,355). By means of a laser-beam the light-absorbing layer can be locally evaporated, so that recesses or pits are formed through which a light beam can fall onto the light reflecting layer. The substrate coated in this way is an effective medium, for providing pits having a suitable distribution, number and size. However, this known recording medium has the disadvantage that the applied layers are extremely sensitive to mechanical damage. Also this known manufacturing process is very complicated and, time-consuming and, therefore, expensive.

Another a compact disc, comprising a circular disc-shaped translucent synthetic substrate is known. Pits are impressed, cast, or preferably formed into the surface of this disc by pressing the synthetic substrate into a mold, in which the lateral wall provides a master plate. The pitted synthetic discs are then vapor-deposited with a layer of pure aluminum. Then aluminum itself has to be coated with a protective layer, so that the recording carrier is durable and corrosion resistant. The manufacture of this other known compact disc is also expensive, especially the varnishing of the metal layer, which is time consuming and has to be done extremely carefully.

Furthermore varnishing installations produce relatively large amounts of dust and chemical pollution which disturbs the high-vacuum deposition process, and they require a lot of space, which again affects manufacturing costs.

SUMMARY OF THE INVENTION

Therefore an object of the invention is to provide a moderate price recording medium which does not require a dye layer or a protective varnish.

This is accomplished in accordance with the present invention by applying a single layer to the substrate of a corrosion resistant metal or a combination of metals from the groups 4N (titanium, zirconium, and hafnium) 5N (vanadium, niobium, and tantalum), 6N (chromium, molybdenum and tungsten), 7N (manganese, technetium and rhenium), or 8N (iron, cobalt, nickel, ruthenium, rhodium, palladium, osmium, iridium, and platinum) of the periodic system of the elements, for example of NiCr, by means of cathode evaporation in vacuum.

If the light reflecting layer is supposed to be gold-colored, the layer applied onto the substrate by means of cathode evaporation in vacuum is formed of a corrosion resistant combination of metals from the groups 1N (copper, silver, and gold) and 2N (zinc, cadmium, and mercury) of the periodic table of the elements, for example of CuBe.

In any event, the layer applied by sputtering in vacuum has the advantage of being extremely resistant to mechanical damage; also it is very corrosion resistant and, thus, avoids application of the dye layer, which is so time consuming and requires a special facility for its application.

BRIEF DESCRIPTION OF THE DRAWINGS

The invention allows very diverse possible embodiments; one of them is represented schematically in more detail in the attached drawings.

DETAILED DESCRIPTION OF THE PREFERRED EMBODIMENTS

Figure 1:
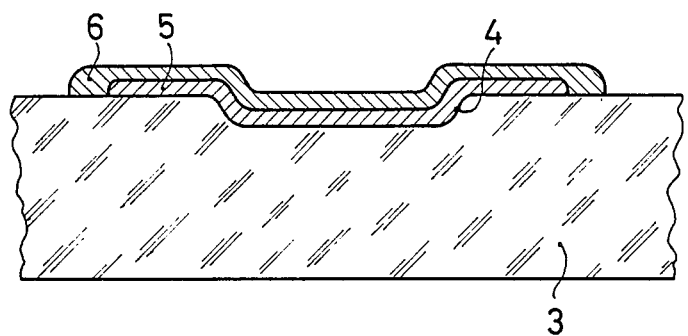
FIG. 1 shows a partial cross-section through a compact disc of the conventional type. For greater clarity, the features are not drawn to scale

The conventional compact disc shown in FIG. 1 comprises a disc-shaped substrate (3) of a translucent synthetic, for example a polycarbonate, having cavities, the so-called "pits", (4) are impressed, spliced in or cast on one side. A layer (5) of pure aluminum is vapor deposited onto the surface of the substrate (3), at least in the area of the pits (4). After this the layer (5) is coated with a protective lacquer layer (6), which prevents damage or corrosion of the aluminum layer.

A light beam is directed from below onto the fast rotating disc-shaped substrate (3), it penetrates into the disc and then is reflected by the metal layer (5). The reflected light beam is captured by a sensor disposed below the disc and is processed to produce an electric signal. This is well-known method which does not require further discussion here.

Figure 2:
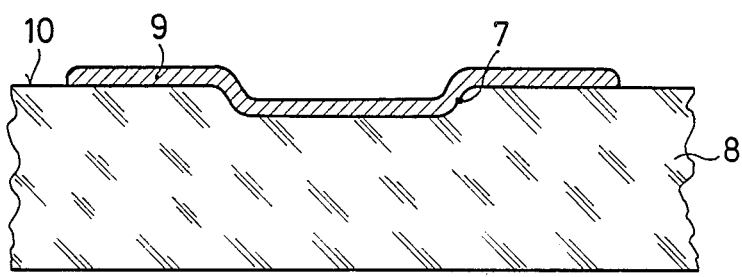
FIG. 2 shows a partial cross-section through a compact disc in accordance with the present invention. The proportions therein correspond to those of the compact disc shown in FIG. 1.

In the inventive embodiment according to FIG. 2 the substrate (8) having small recesses or pits (7) is coated with a recording surface layer (9) which provides a recording surface having outwardly disposed recesses and which is highly reflective, mar-proof, non-oxidizing and suitable for printing. This layer (9) is applied by DC-sputtering. Metals and combinations of metals from the groups 4N, 5N, 6N, 7N or 8N of the periodic table of the elements can be used as materials for this purpose, as far as they provide the said properties, as for example nickel-chrome.

In the event that the disc is to be used as a CD-video disc and, thus, must be gold-colored, use of a copper-beryllium layer is recommended.

The particular advantage of the compact disc shown in the FIG. 2 is that it permits simplified, low-cost manufacturing, since a varnishing facility is no longer needed. In addition to this, the compact disc can be produced in any sputtering installation merely by using, for example, a nickel-chrome or copper-beryllium target.

We claim:

1. An optical recording medium, comprising:
   a base material having a surface; and
   a recording surface layer means applied to said surface, said recording surface layer means including:
      a light-reflecting layer adhering to said surface of the base material, said layer being formed of a metal or a combination of metals selected from the group consisting of vanadium, niobium, tantalum, chromium, molybdenum, tungsten, manganese, technetium, rhenium, iron, cobalt, nickel, ruthenium, rhodium, palladium, osmium, iridium, and platinum, and said layer being applied by means of cathode evaporation in a vacuum.

2. An optical recording medium, comprising:
a base material having a surface; and
a recording surface layer means applied to said surface, said recording surface layer means including:
a light-reflecting layer adhering to said surface of the base material, said layer being formed of a metal or a combination of metals selected from the group consisting of copper, silver, zinc, cadmium, and mercury, and said light-reflecting layer being applied by means of cathode evaporation in vacuum.

3. An optical recording medium comprising:
a base material substrate having recording recesses on a surface thereof; and
a light-reflecting layer adhering to said surface of the substrate and covering the recesses, said layer being formed of a combination of copper and beryllium and applied by means of cathode evaporation in a vacuum.

4. The invention according to claim 1, and the surface of the base material having recording recesses therein, and the light-reflecting layer being applied over said recesses.

5. The invention according to claim 4 and the light-reflecting layer providing a reflective recording surface having generally outwardly disposed recording recesses therein.

6. The invention according to claim 5 and said light-reflecting layer being formed of a combination of nickel and chromium.

7. The invention according to claim 1 and said light-reflecting layer being formed of a combination nickel and chromium.

8. The invention according to claim 2 and the surface of the base material having recording recesses therein, and the light-reflecting layer being applied over said recesses.

9. The invention according to claim 8 and the light-reflecting layer providing a reflective recording surface having generally outwardly disposed recording recesses therein.

10. The invention according to claim 3 and the light-reflecting layer providing a reflective recording surface having generally outwardly disposed recording recesses therein.

11. An optical recording medium, comprising:
a substrate having a surface; and
a recording surface layer means applied to said surface, said recording surface layer means including:
a light-reflecting layer applied to the surface of the substrate by cathode evaporation in a vacuum, said layer being formed of a combination of at least two metals selected from the group consisting of copper, silver, gold, zinc, cadmium and mercury.

12. The invention according to claim 11 and the surface of the substrate having recording recesses therein, and the light-reflecting layer being applied over the recesses.

13. The invention according to claim 12 and the light-reflecting layer providing a reflective recording surface having generally outwardly disposed recording recesses therein.

14. An optical recording medium, comprising:
a substrate having a surface; and
a recording surface layer means applied to said surface, said recording surface layer means including:
a light-reflecting layer applied to the surface of the substrate by cathode evaporation in a vacuum, said layer being formed of a combination of copper and beryllium.

15. A method of making an optical recording medium, said method comprising:
preparing a surface on a substrate, said surface having recesses therein corresponding to matter to be recorded on the optical recording medium; and
applying a light-reflecting layer onto said surface and over said recesses by cathode evaporation in a vacuum to form a light-reflecting outwardly-disposed surface means having outwardly-disposed recesses therein,
said light-reflecting layer being formed of a material selected from the group consisting of:
(a) a metal or a combination of metals selected from the group consisting of vanadium, niobium, tantalum, chromium, molybdenum, tungsten, manganese, technetium, rhenium, iron, cobalt, nickel, ruthenium, rhodium, palladium, osmium, iridium, and platinum;
(b) a metal or combination of metals selected from the group consisting of copper, silver, zinc, cadmium, and mercury;
(c) a combination of two or more metals selected from the group consisting of gold, copper, silver, zinc, cadmium, and mercury; and
(d) a combination of copper and beryllium.

16. The invention according to claim 15 and the layer being formed of a combination of nickel and chromium.

17. The invention according to claim 15 and said layer being formed of a metal or a combination of metals selected from the group consisting of vanadium, niobium, tantalum, chromium, molybdenum, tungsten, manganese, technetium, rhenium, iron, cobalt, nickel, ruthenium, rhodium, palladium, osmium, iridium, and platinum.

18. The invention according to claim 15 and a metal or combination of metals selected from the group consisting of copper, silver, zinc, cadmium, and mercury.

19. The invention according to claim 15 and a combination of two or more metals selected from the group consisting of gold, copper, silver, zinc, cadmium, and mercury.

20. The invention according to claim 15 and a combination of copper and beryllium.

* * * * *

UNITED STATES PATENT AND TRADEMARK OFFICE
CERTIFICATE OF CORRECTION

PATENT NO. : 4,956,216
DATED : September 11, 1990
INVENTOR(S) : Alfons Hausler It is certified that error appears in the above-identified patent and that said Letters Patent is hereby corrected as shown below:

ON THE TITLE PAGE, IN ITEM [57] ABSTRACT:

Lines 4 and 5, change "groups 4N, 5N, 7N or 8N of the periodic table of elements" to -- group consisting of vanadium, niobium, tantalum, chromium, molybdenum, tungsten, manganese, technetium, rhenium, iron, cobalt, nickel, ruthenium, rhodium, palladium, osmium, iridium, and platinum --.

Line 6, change "B Applied" to -- be applied --.

Column 4:

Claim 18, line 1, after "and" insert -- said layer being formed of --.
Claim 19, line 1, after "and" insert -- said layer being formed of --.
Claim 20, line 1, after "and" insert -- said layer being formed of --.

Signed and Sealed this

Twenty-eighth Day of July, 1992

*Attest:*

DOUGLAS B. COMER

*Attesting Officer*      *Acting Commissioner of Patents and Trademarks*